United States Patent [19]

Bikson et al.

[11] Patent Number: 4,508,852

[45] Date of Patent: Apr. 2, 1985

[54] COMPOSITIONS AND METHOD OF PREPARATION BY CHLOROSULFONATION OF DIFFICULTLY SULFONATABLE POLY(ETHER SULFONE)

[75] Inventors: Benjamin Bikson, Brookline; Myron J. Coplan, Natick; Gertrud Götz, Brookline, all of Mass.

[73] Assignee: Albany International Corp., Albany, N.Y.

[21] Appl. No.: 534,799

[22] Filed: Sep. 22, 1983

[51] Int. Cl.$^3$ .............................................. C08G 65/48
[52] U.S. Cl. .................................... 521/27; 210/500.2; 521/30; 525/534; 525/535
[58] Field of Search ................. 525/534, 535; 210/500.2; 521/27, 30

[56] References Cited

U.S. PATENT DOCUMENTS 4,268,650 5/1981 Rose ...................................... 525/534
4,273,903 6/1981 Rose ...................................... 525/534
4,413,106 11/1983 Coplan et al. ....................... 525/534
4,414,368 11/1983 Coplan et al. ....................... 525/534

*Primary Examiner*—Lester L. Lee
*Attorney, Agent, or Firm*—Kane, Dalsimer, Kane, Sullivan and Kurucz

[57] ABSTRACT

Novel chlorosulfonated polyarylethersulfones derived by controlled treatment with chlorosulfonic acid of difficultly sulfonatable polyarylethersulfone of recurring units of the formula:

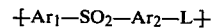

wherein $Ar_1$ and $Ar_2$ represent phenylene or phenylene substituted with non-deactivating groups where $Ar_1$ and $Ar_2$ may be the same or different are described with the method of their preparation. The partially sulfonated-sulfochlorinated polyarylethersulfones may be subsequently converted to cation-exchange materials or ion-exchange materials with mixed cation and anion exchange sites.

8 Claims, No Drawings

COMPOSITIONS AND METHOD OF PREPARATION BY CHLOROSULFONATION OF DIFFICULTLY SULFONATABLE POLY(ETHER SULFONE)

BACKGROUND OF THE INVENTION

1. Field of the Invention

The invention relates to a process of chlorosulfonation of a class of poly(ether sulfones) which are known to be notoriously difficult to sulfonate. The novel chlorosulfonated poly(ether sulfones) and derivatives thereof are useful as membrane forming materials for a variety of separation processes, e.g. reverse osmosis, ultra-filtration, ion exchange, electrodialysis and like processes.

2. Brief Description of the Prior Art

Sulfonation of polysulfones is disclosed in U.S. Pat. No. 3,709,841, wherein Quentin describes a preparation of polyaryl polymers in which part of the aromatic rings are substituted with hydroxysulfonyl radical (—$SO_3H$) also called sulfonic acid groups. However, aromatic poly(ether sulfones) such as those made up of repeating units of the formula:

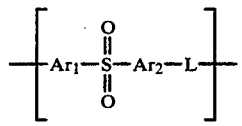

(I)

wherein $Ar_1$ and $Ar_2$ (which may be the same or different) are phenylene, or partially substituted phenylene with non-deactivating groups; and L represents a divalent linking group such as such as oxygen, are notoriously difficult to sulfonate on the aromatic rings in the chain due to the electron withdrawing effect of the sulfone linkages which deactivate the adjacent aromatic rings for electrophilic substitution. Sulfonation of these polymers with chlorosulfonic acid or oleum at ambient temperatures require an enormous excess of sulfonation agent and results in a highly degraded product with extents of sulfonation that are impossible to control. The surplus of sulfonation agent complicates the workup procedures (see U.S. Pat. No. 4,272,903, Examples 11 and 12). In order to overcome the above difficulties, copolymers of the above polysulfones have been prepared that contained in addition to the repeat unit (I) described above, a variable amount of easily sulfonatable units of the formula:

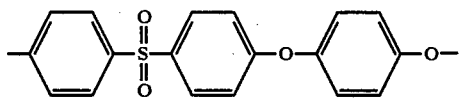

(II)

(see the above cited U.S. Pat. No. 4,273,903).

SUMMARY OF THE INVENTION

The present invention teaches how aromatic poly(ether sulfones) which may be linear or branched but substantially comprising units of the formula (I) can be chlorosulfonated on the aromatic rings of the chain to control degrees of substitution with chlorosulfonic acid under relatively high temperature conditions. In the course of chlorosulfonation the aromatic rings of the polymer chain are substituted with chlorosulfonyl (—$SO_2Cl$) radicals and hydroxysulfonyl radicals (—$SO_3H$). The degree of substitution is controlled by the choice of the mole ratio of chlorosulfonic acid to aromatic rings of the polymer, by the reaction temperature and the duration of the reaction.

The novel process described herein for the chlorosulfonation of a poly(ether sulfone) having recurring units of the formula (I) described above employs chlorosulfonic acid at a temperature within the range of 40° C. to 151° C., the polymer preferably being dissolved in an inert organic solvent and the proportion of chlorosulfonic acid employed being within the range of 0.2 to 10.0 moles per mole of poly(ether sulfone) reactant.

The invention thus also comprises a chlorosulfonated poly(arylether sulfone) resin, comprising arylene units substantially all of which are covalently bonded to a sulfone linking group wherein some of the arylene moieties are substituted with hydroxysulfonyl groups and some of the arylene moieties are substituted with chlorosulfonyl groups, the ratio of chlorosulfonyl groups to hydroxysulfonyl groups being within the range of from 0.01–20:1 while the combined content of hydroxysulfonyl and chlorosulfonyl groups in the above mentioned polymer is from about 0.05 to about 4 milliequivalent per gram of dry resin.

The term "inert organic solvent" as used herein means an organic solvent for poly(ether sulfone) which does not enter into reaction with the reactant or adversely affect the desired course of the reaction.

DETAILED DESCRIPTION OF THE PREFERRED EMBODIMENTS OF THE INVENTION

The chlorosulfonation method of the invention is carried out by simple admixture of the polymer containing recurring units of the formula (I) given above, with chlorosulfonic acid. One variant of the polymer class is sold commercially by ICI under the tradename Victrex.

The amount of chlorosulfonic acid employed in the reaction can be varied to effect the ratio of —$SO_2Cl$ to —$SO_3H$ groups in the reaction product while reaction time and temperature of the reaction can be used to control the overall degree of substitution. The amount employed is generally between 0.2–10 moles of chlorosulfonic acid per mole of poly(ether sulfone) with higher ratios favorable for the formation of the chlorosulfonyl groups.

The chlorosulfonation may be carried out at temperatures of 40° C. to 151° C. preferably at 70° C. to 120° C. in a solution of organic solvents for the poly(ether sulfone) that are inert as regards the chlorosulfonation reaction. Alternatively neat chlorosulfonic acid can be used as the solvent as well. Halogenated hydrocarbons, especially 1,2-dichloroethane and 1,1,2,2-tetrachoroethane are preferred as solvents. On addition of chlorosulfonic acid to the solution of poly(ether sulfone) in a chlorinated hydrocarbon a phase separation frequently takes place prior to any sensible degree of reaction. The heavier phase consists of the entire amount of the polymer dissolved in a mixed solvent of chlorosulfonic acid and some chlorinated hydrocarbon; the top layer consists essentially of the chlorinated hydrocarbon. It is advantageous, therefore, to employ concentrations of poly(ether sulfone) in a mixture of chlorosulfonic acid and chlorinated hydrocarbon that leads to a single homogenous phase at ambient temperature. Thereafter the reaction mixture is brought to the desired temperature to accomplish the chlorosulfonation. Alternatively the chlorosulfonic acid can be added to the solution of poly(ether sulfone) in chlorinated hydrocarbon that is kept at the desired reaction temperature.

Whether or not an initial homogenous solution is prepared, in the course of the chlorosulfonation reaction a phase separation takes place with the heavier layer consisting of a mixture of partially chlorosulfonated polymer, the chlorosulfonic acid and a smaller amount of chlorinated hydrocarbon and the top layer being essentially only chlorinated hydrocarbon. The reaction is continued until the desired level of chlorosulfonation is reached.

When the desired degree of reaction has been reached, the reaction mixture may be allowed to cool to ambient temperatures and the desired reacted polymer may be separated from the reaction mixture by conventional techniques such as by decantation, followed by washing and drying.

The chlorosulfonation reactions can be also carried out in the neat chlorosulfonic acid viscous dope mixtures. The dope is prepared by dissolution of poly(ether sulfone) in chlorosulfonic acid at ambient temperature and the chlorosulfonation accomplished by heating the thus prepared dope to the desired temperature.

The chemical structure of the resins of the invention and the extent of their substitution were confirmed by high resolution 270 MHz NMR spectroscopy, IR spectroscopy and microanalytical determination of chlorine and sulfur contents.

The chlorosulfonated poly(ether sulfones) prepared according to the invention contain as the total amount of chlorosulfonyl ($-SO_2Cl$) and hydroxysulfonyl ($-SO_3H$) radicals from about 0.05 to 4.0 meq. per gram of dry resins with the ratio of chlorosulfonyl radicals to hydroxysulfonyl radicals being varied from about 0.01 to 20:1.

The resins of the invention are generally soluble in polar solvents such as dimethyl formamide (DMF) dimethylacetoamide (DMAC) and the like, while the resins with the high degrees of chlorosulfonation and high $-SO_3H$ to $-SO_2Cl$ group ratios are also soluble in alcohol/water mixtures. Membranes can be advantageously prepared from the chlorosulfonated poly(ether sulfone) compounds of the invention by casting a solution of the resin on a surface of a dense support or onto the surface of a porous support followed by evaporation of the solvent. Reinforced membranes can be prepared by casting onto a screen or a woven fabric. The membranes can be crosslinked by reacting the active chlorosulfonyl groups with polyfunctional amines to make the membranes more dense and insoluble with a combined increase in selectivity. The chlorosulfonic groups remaining in any cast film can be also utilized for further derivatization with mono and poly functional amines and alcohols to alter the transport properties and permselectivity of the membranes. The casting solvents to be used in the latter cases should be dry and unreactive towards chlorosulfonyl groups to achieve a maximum degree of derivatization.

The chlorosulfonated poly(ether sulfones) can be derivatized by reacting them with substances that contain reactive amino or hydroxyl groups. Membranes are prepared from these poly(ether sulfone) derivatives by casting from suitable polar solvents (e.g. DMF, DMAC and the like). As a specific example chlorosulfonated poly(ether sulfones) are reacted with polyfunctional amines through primary or secondary amine groups to give ion exchange resin materials with mixed strong cation exchange and weak anion exchange sites. The ratio of the sulfonic acid group ($-SO_3H$) to the weakly anionic ones ($-NH_2$, $-NH-$ or $-N=$) being varied from 0.05 to 25 with the degree of substitution of the aromatic rings with both the cationic and anionic sites ranging from 0.05 to 0.6 (the degree of substitution is defined per aromatic ring). The ion exchange resin with mixed strong cationic and weak anionic tertiary amine groups can be further reacted with haloalkanes to yield an ion exchange resin with mixed strong cation exchange sites and strong anion exchange sites (quarternary ammonium groups).

Finally, the chlorosulfonyl substituents of the reacted polymer can be hydrolyzed with boiling water or by reacting them with an appropriate base to form the sulfonated derivatives in the free acid or alkali forms, as well as any other counter ion form, respectively, and membranes of thus formed sulfonated poly(ether sulfones) can be prepared by casting from polar solvents.

The resins of the invention are particularly useful as ion exchange membranes for industrial separation processes, in particular, reverse osmosis desalination of liquids. The membranes can be used in a flat sheet, tubular or hollow-fiber forms.

Reverse osmosis membranes of superior productivity can be prepared by coating the materials of the invention on porous flat sheets, inside-flow tubes and porous hollow fibers to form composite membranes. Alternatively, asymmetric membranes can be prepared by casting and solution spinning techniques. Composite membranes prepared as described above possess particularly advantageous properties of high product flow rates combined with high degrees of salt rejection. The degree of salt rejection being defined as follows:

$$R = \frac{\text{concentration of salt in the permeate}}{\text{concentration of salt in the feed}} \times 100\%$$

The following examples describe the manner and process of making and using the invention and set forth the best mode contemplated by the inventors for carrying out the invention but are not to be construed as limiting.

EXAMPLE 1

100 g of a poly(ether sulfone) having the formula (I) described above (Victrex; PES-100P; Imperial Chemical Industries, Ltd., England) predried 4 hours at 150° C., were dissolved in 114 cc of chlorosulfonic acid (2 moles per aromatic ring). The reaction mixture was slowly stirred for 2 hours at room temperature under a nitrogen gas atmosphere and then the reaction temperature was raised to circa 82° C. and kept at this temperature for 30 minutes. The hydrochloric acid that evolved was stripped by the nitrogen and trapped in sodium hydroxide solution. The reaction mixture was cooled to 0° C. and the reaction terminated by addition of 500 cc of cold isopropyl alcohol. The precipitate that was formed on the addition of isopropyl alcohol was washed twice with additional 500 cc of cold isopropyl alcohol and dried in a vacuum oven ($10^{-1}$ torr) to a constant weight. The yield of the polymeric product was 105 g. Analysis of the reaction product indicated that the reaction lead to formation of partially sulfonated, partially sulfochlorinated polymer with almost equal amounts of hydroxysulfonyl and chlorosylfonyl groups, e.g. the concentration of $-SO_3H$ and $-SO_2Cl$ groups was 1.75 meq/g and 1.65 meq/g respectively. The intrinsic viscosity of the chlorosulfonated polymer as determined in 0.5M NaClO$_4$ dimethyl formamide solution at 25° C. was 0.13.

EXAMPLE 2

50 g of chlorosulfonated poly(ether sulfone) prepared in the same way as in Example 1, supra., was dissolved in 500 cc of boiling water and refluxed for 2 hours. The water was distilled off to yield 48 g of water soluble sulfonated poly(ether sulfone), with an ion exchange capacity (IEC) equal to 3.4 meq/g. dry resin.

EXAMPLE 3

50 g of chlorosulfonated poly(ether sulfone) prepared in the same way as in Example 1, supra., was dissolved in 100 cc of drymethylformamide and 20 g of 3-dimethylaminopropylamine were added. The reaction mixture was stirred at room temperature for an hour and then poured into saturated NaCl water solution. The gelly precipitate was separated, suspended in deionized water and dialyzed. The dialyzed suspension was rotary evaporated to dryness to yield 54 g of polymeric product. The polymeric product contained strong cation exchange sites (—SO$_3$Na) as well as weak tertiary amine sites with almost equimolar amounts, e.g. 1.7 and 1.6 meq/g, respectively. Nitrogen content of the product as determined by microanalysis was 4.7%.

EXAMPLE 4

25 g of mixed cationic weakly anionic poly(ether sulfone) prepared in the same way as in the Example 3, supra., were suspended in 100 cc of 0.1N KOH methanolic solution, 10 cc of methyl iodide was added to the reaction mixture and it was refluxed for an hour. The polymeric product in the form of a gelly layer was isolated, suspended in deionized water and dialyzed. The dialyzed solution was rotary evaporated to dryness. The yield of the water soluble polymer with mixed strong cation (—SO$_3^-$) and strong anion exchange functional groups [N$^+$(CH$_3$)$_4$] was 25.3 g. Nitrogen content of the product as determined by microanalysis was 4.4%.

EXAMPLE 5

100 g of poly(ether sulfone) [Victrex, supra.] predried 4 hours at 150° C. were dissolved in 500 cc of 1,1,2,2-tetrachloroethane at room temperature. The solution kept under positive N$_2$ pressure was brought to 130° C. and 42.5 cc of chlorosulfonic acid (0.75 moles per aromatic ring) was added to the reaction mixture within a 2 minute period. The reaction mixture was kept at 150° C. for 15 minutes and then quickly cooled to room temperature. The top layer that consisted almost solely of tetrachloroethane was decanted and the sludge precipitate dissolved in 500 cc of isopropyl alcohol/H$_2$O solution 90/10 by volume. The solution was rotary evaporated to dryness and the residual polymer dried in a vacuum oven at room temperature to a constant weight. The yield of sulfonated polysulfone was 113 g, the IEC=1.7 meq/g and the intrinsic viscosity as determined in 0.5M NaCLO$_4$ dimethyl formamide solution at 25° C. was 0.13.

EXAMPLE 6

100 g of poly(ether sulfone) [Victrex, supra] predried 4 hours at 150° C., were suspended in 500 cc of 1,2-dichloroethane. The reaction mixture, kept under nitrogen atmosphere, was brought to reflux and 42.5 cc of chlorosulfonic acid (0.75 moles per aromatic ring) was added to the reaction mixture within a 2 minute period. The originally sludgy solution became clear on addition of chlorosulfonic acid. However, the solution separated into two phases as the sulfonation advanced. After 40 minutes, the reaction was stopped by cooling rapidly the reaction mixture to room temperature. The top layer that consisted almost soley of dichloroethane was decanted and the sludgy precipitate dissolved in 500 cc of isopropyl alcohol/H$_2$O solution, 90/10 by volume. The solution was rotary evaporated to dryness and the residual polymer dried to a constant weight (10$^{-1}$ torr) in a vacuum oven at room temperature to yield 110 g of sulfonated polysulfone. The sulfonated polysulfone that was prepared according to this procedure had an intrinsic viscosity of 0.15 as determined in 0.5M NaClO$_4$ dimethyl formamide solution at 25° C. The ion exchange capacity of this sulfonated polysulfone sample was 1.8 meq/g of dry resin.

EXAMPLE 7

The poly(ether sulfone) [Victrex, supra.] was treated with chlorosulfonic acid as described in Example 6, except that the reaction product was precipitated into a dry isopropyl alcohol, washed with isopropyl alcohol twice and dialyzed. The reaction product was then freeze dried followed by a vacuum drying (10$^{-1}$ torr) at room temperature to a constant weight to give a partially sulfonated sulfochlorinated polymer, e.g. the concentration of —SO$_3$H and —SO$_2$Cl groups was 1.55 meq/g and 0.2 meq/g, respectively.

EXAMPLE 8

The poly(ether sulfone) [Victrex, supra.] was treated with chlorosulfonic acid as described in Example 6 except that the reaction time was 30 minutes. The sulfonated polysulfone that was prepared according to this procedure had an intrinsic viscosity of 0.18 as determined in 0.5M NaClO$_4$ dimethyl formamide solution at 25° C. and an IEC of 1.5 meq/g.

EXAMPLE 9

50 g of poly(ether sulfone) [Victrex, supra.] predried 4 hours at 150° C. were dissolved at room temperature in 252 g of chlorosulfonic acid (5 moles of acid per aromatic ring). The reaction mixture, kept under dry nitrogen atmosphere was brought to 75° C. and stirred at this temperature for 30 minutes. The hydrochloric acid that evolved was trapped in 1N NaOH solution. After a 30 minute period, the reaction was cooled rapidly to room temperature and the viscous dope poured into a 50/50 solution of isopropyl alcohol/methylene chloride cooled to 0° C. The precipitate was washed with isopropyl alcohol, placed in cellulose acetate dialysis tubes and dialyzed for 48 hours. The dialyzate was freeze-dried and subsequently dired in a vacuum oven (10$^{-1}$ torr), at room temperature to a constant weight to yield 55 g of partially sulfonated partially sulfochlorinated poly(ether sulfone); e.g. the concentration of —SO$_2$Cl and —SO$_3$H groups was 2.4 meq/g, and 0.25 meq/g respectively.

EXAMPLE 10

The poly(ether sulfone) [Victrex, supra.] was treated with chlorosulfonic acid as described in Example 9, except that after the reaction was executed, the top layer decanted, the reaction mixture cooled to 5° C., 100 cc of benzene was added with vigorous stirring followed by addition of a solution of 50 g of 3-dimethylaminopropylamine and 50 g of pyridine in 200 cc of dimethyl formamide. The reaction mixture kept at 5° C. was stirred for 4 hours and then poured into saturated sodium chloride solution, washed exhaustively with saturated sodium chloride solution and dialized. The dialyzate was rotary evaporated to dryness and the residual polymer dried to a constant weight in a vacuum oven ($10^{-1}$ torr) at 50° C. to yield 62 g of partially sulfoaminated partially sulfonated polysulfone, e.g. the concentration of —$SO_3Na$ and —$SO_2NH(CH_2)_3N(CH_3)$ groups was 0.8 meq/g and 2.0 meq/g, respectively.

EXAMPLE 11

10 g of the chlorosulfonated Victrex prepared in the same way as in Example 10 were dissolved in 30 cc of dimethyl formamide, distilled over calcium hydride. The solution was cast on a glass plate and drawn down to a thickness of 100 u with a Gardner knife. The solvent was swept with a stream of dry nitrogen at 60° C. in a circulating air oven followed by drying in a vacuum oven ($10^{-1}$ torr). Thus formed film of chlorosulfonated Victrex was crosslinked with a 10% solution of 1,6-hexanediamine in dry ethyl ether at room temperature. The crosslinked ion exchange membrane, that was insoluble in dimethylformamide, was washed with deionized water and dried at room temperature. The ion exchange capacity of the thus prepared membranes was 2,0 meq/g, water content 27% and electrical resistance —8 ohm cm². The permselectivity of the membrane estimated by measuring the membrane potential between the 0.1N and 1N KCL solutions was 95% of theoretical.

EXAMPLE 12

5 g of sulfonated Poly(ether sulfone) prepared as in Example 6 were dissolved in 100 cc of isopropyl alcohol water mixture 90/10 by volume. A composite hollow fiber membrane was then prepared by coating a porous polysulfone hollow fiber continuously with the prepared coating solution, the solvents being removed by drying to 120° C.

The composite hollow fiber membranes, when utilized in reverse osmosis desalination process of 3000 ppm brackish water, gave 96–98% salt rejections and fluxes between 1.5 and 2 gfd at pressure of 400 psi. The composite hollow fiber membranes were found to be durable in an oxidative environment, c.f. lifetimes over 3000 hours were found to be common for the composite membranes tested against brackish water containing 100 ppm active chlorine as $OCl^-$, at pH 8.

What is claimed:

1. A chlorosulfonated polyarylethersulfone resin which may be linear or branched and which comprises a plurality of repeating units of the formula:

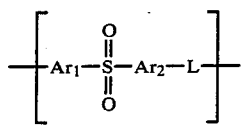

wherein $Ar_1$ and $Ar_2$ each represent phenylene or phenylene partially substituted with non-deactivating groups and where $Ar_1$ and $Ar_2$ may be the same or different and wherein some of the phenylene moieties are also substituted with hydroxysulfonyl groups and some of the phenylene moieties are also substituted with chlorosulfonyl groups, the ratio of chlorosulfonyl groups to hydroxysulfonyl groups being within the range of from 0.01–20:1 while the combined contents of both hydroxysulfonyl and chlorosulfonyl groups in the above mentioned polymer range from about 0.05 to about 4 milliequivalents per gram of dry resin; L represents oxygen.

2. A sulfonated polyarylethersulfone that is the product of the hydrolysis of the resin of claim 1, that contains from 0.05 to 4 milliequivalents per gram of hydroxysulfonyl radicals in the form of free acid.

3. A sulfonated polysulfone according to claim 2 which is in the form of an ammonium salt or alkaline earth metal salt.

4. The product obtained upon reaction of the resin of claim 1 with primary or secondary mono or poly functional amines to give an ion exchange resin material with mixed strong cation exchange and weak anion exchange sites, the ratio of the sulfonic acid groups to the weakly anionic ones being varied from 0.05 to 25 with the degree of substitution of the aromatic rings with both strong cationic and anionic sites ranging from 0.05 to 0.6.

5. An ion exchange resin with mixed strong cationic and weak anionic groups according to claim 4 that is reacted with haloalkanes to yield an ion exchange resin with mixed strong cation exchange sites and strong anion exchange sites in the form of quaternary ammonium groups.

6. A semipermeable composite membrane comprising a thin semipermeable film of the resin of claim 1 deposited on one side of a microporous substrate.

7. A process for the chlorosulfonation of a poly(ether sulfone) containing repeating units of the formula;

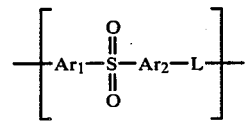

wherein $Ar_1$ and $Ar_2$ each represent phenylene or phenylene partially substituted with non-deactivating groups and where $Ar_1$ and $Ar_2$ may be the same or different; L represents oxygen, which comprises:
chlorosulfonating said poly(ether sulfone) dissolved in an inert organic solvent with chlorosulfonic acid under homogenous reaction conditions at a temperature within the range of from 40° C. to 151° C., the proportion of chlorosulfonic acid employed being within the range of 0.2 to 10 moles per mole of poly(ether sulfone) reactant.

8. A membrane prepared from the poly(ether sulfone) chlorosulfonated by the process of claim 7.

* * * * *

UNITED STATES PATENT AND TRADEMARK OFFICE
CERTIFICATE OF CORRECTION

PATENT NO. : 4,508,852
DATED : April 2, 1985
INVENTOR(S) : Benjamin Bikson and Myron J. Coplan It is certified that error appears in the above—identified patent and that said Letters Patent is hereby corrected as shown below:

Col. 1, line 46: - "Patent No. 4,272,903" should read
 -- Patent No. 4,273,903 -- .

Col. 3, line 9: - "smaller amount" should read
 -- small amount -- .

Col. 4, line 48: - "PES-100P" should read -- PES-600P -- .

Col. 5, line 17: - "drymethylformamide" should read
 -- dimethylformamide -- .

Signed and Sealed this

Ninth Day of July 1985

[SEAL]

Attest:

DONALD J. QUIGG

Attesting Officer     Acting Commissioner of Patents and Trademarks